United States Patent [19]

Oda

[11] Patent Number: 5,323,237
[45] Date of Patent: Jun. 21, 1994

[54] TIMING COMPENSATOR FOR VIDEO SIGNAL PROCESSOR

[75] Inventor: Osamu Oda, Saitama, Japan

[73] Assignee: Sony Corporation, Tokyo, Japan

[21] Appl. No.: 12,627

[22] Filed: Feb. 2, 1993

Related U.S. Application Data

[63] Continuation of Ser. No. 715,656, Jun. 14, 1991, abandoned.

[30] Foreign Application Priority Data

Jun. 19, 1990 [JP] Japan .................................. 2-158627

[51] Int. Cl.⁵ .......................... H04N 5/04; H04N 5/14
[52] U.S. Cl. .................................. 348/500; 348/571; 348/708; 348/725
[58] Field of Search ........................ 358/27–29, 358/168, 169, 160, 37, 166, 39, 148, 149, 174, 40, 179, 21 R, 17, 315, 320, 325, 339, 337, 188; H04N 5/14, 5/20, 9/77, 5/04, 5/44

[56] References Cited

U.S. PATENT DOCUMENTS

| | | | |
|---|---|---|---|
| 3,781,701 | 12/1973 | Cecchin et al. | 358/28 |
| 4,187,519 | 2/1980 | Vitols et al. | 358/169 |
| 4,649,427 | 3/1987 | Tsushima | 358/160 |
| 4,667,237 | 5/1987 | Yokomizo | 358/160 |
| 4,670,790 | 6/1987 | Sawada et al. | 358/188 |
| 4,931,858 | 6/1990 | Honjo | 358/37 |
| 5,260,774 | 11/1993 | Takayama | 358/29 |

FOREIGN PATENT DOCUMENTS

| | | | |
|---|---|---|---|
| 0221769 | 5/1987 | European Pat. Off. | H04N 9/78 |
| 58-146181 | 8/1983 | Japan | H04N 5/22 |

Primary Examiner—James J. Groody
Assistant Examiner—Safet Metjahic
Attorney, Agent, or Firm—Lewis H. Eslinger; Jay H. Maioli

[57] ABSTRACT

A color television image display apparatus wherein an image quality control signal is generated with regard to every field of an input video signal in accordance with sampled data obtained therefrom and then is supplied to an image signal processor to execute automatic adjustment of the image quality is equipped with a delay circuit having a delay time substantially equal to the time required for generation of the image quality control signal, and the video signal is supplied via such delay circuit to the video signal processor so that both the image quality control signal and the video signal to be controlled by such image quality control signal are inputted to the video signal processor substantially without a timing difference therebetween.

1 Claim, 3 Drawing Sheets

TIMING COMPENSATOR FOR VIDEO SIGNAL PROCESSOR

This is a continuation of application Ser. No. 07/715,656, filed Jun. 14, 1991, now abandoned.

BACKGROUND OF THE INVENTION

1. Field of the Invention

The present invention relates to a color television image display apparatus equipped with an automatic image quality control means.

2. Description of the Prior Art

For the purpose of continuously achieving an optimal image state in television, technical development is progressing with regard to a television monitor having a function of automatically controlling the luminance, color saturation and so forth to optimal conditions in every field of a video signal. When the image being displayed in a television monitor changes momentarily among light, dark, colorful and nearly monochromatic states, it is impossible to achieve a desired optimal image condition continuously if the controls for the luminance, color saturation and so on are set at fixed positions. Therefore, a predetermined unitary amount of the video signal is analyzed and then the luminance control and others are adjusted in a manner to attain the best condition.

For example, as shown in FIG. 2, a video signal fed via a TV tuner 1 and an IF (intermediate frequency) amplifier 2 is supplied to an image quality control signal generator which comprises an A-D (analog-to-digital) converter 3 and an arithmetic processor 4 consisting of a microcomputer.

The arithmetic processor 4 sets, in each field of the video signal, sampling points denoted by $S_{P1}$–$S_{Pn}$ in FIG. 3 and supplies sample timing signals to the A-D converter 3. In accordance with such sample timing signals, the A-D converter 3 executes analog-to-digital conversion of the luminance signal, for example, and then outputs n digital data (voltage value data of the luminance signal) in every field to the arithmetic processor 4. Then the arithmetic processor 4 calculates one field of the luminance data and generates an image control signal $S_{Al}$ of the luminance amplification level in accordance with the result of such calculation (discrimination data determined by the lightness, darkness and so forth of the image). The image control signal $S_{Al}$ thus generated is supplied to a video signal processor 5 where the luminance amplification level is controlled, and the processed signal is outputted to a CRT display unit 6. Since such process is executed with regard to every field, it follows that an optimal image quality is ensured continuously.

According to the image quality control signal generator, it is possible to perform simultaneous adjustment of the color saturation, sharpness and so forth in addition to the luminance control by the same circuitry, hence achieving enhancement in the overall quality of the image being monitored.

However, in the conventional television image display apparatus mentioned above, there occurs a time loss which is required in the A-D converter 3 and the arithmetic processor 4 for generating an image quality control signal $S_{Al}$ to execute automatic image quality adjustment. Suppose now that, in an exemplary case where the arithmetic processor 4 consists of a 4-bit single chip microcomputer, a time of 0.1 second or so is required until an image quality control signal $S_{AI(n)}$ is outputted after sampling the data of one field $F_n$. Then, at the instant the image quality control signal $S_{AI(n)}$ is inputted to the video signal processor 5, the video signal of a field $F_{(n+5)}$, which is posterior by 6 fields to the relevant field $F_n$ sampled for generating the image quality control signal $S_{AI(n)}$, is inputted to the video signal processor 5. Although it is a slight time delay, such delay causes a failure in adjusting the image quality of the field $F_n$ to be adjusted by the image quality control signal $S_{AI(n)}$.

Consequently, there arises a problem that when the image is suddenly changed, the image quality is deteriorated for a moment.

OBJECT AND SUMMARY OF THE INVENTION

It is therefore an object of the present invention to provide an improved color television image display apparatus where both an image quality control signal and a video signal to be controlled by such image quality control signal are inputted to a video signal processor substantially without a timing difference therebetween.

According to one aspect of the present invention, there is provided a color television image display apparatus comprising an image quality control signal generator for sampling predetermined data from an input video signal, producing an image quality control signal in accordance with the data thus sampled, and supplying the image quality control signal to a video signal processor; and a delay means for delaying the input video signal for a time substantially equal to the time required for generation of the image quality control signal in the image quality control signal generator, and supplying the delayed signal to the video signal processor. Due to the function of the delay means, both the video signal and the image quality control signal obtained in the image quality control signal generator in accordance with the video signal are inputted to the video signal processor substantially with a timing coincidence.

The above and other features and advantages of the present invention will become apparent from the following description which will be given with reference to the illustrative accompanying drawings.

DESCRIPTION OF THE PREFERRED EMBODIMENT

Hereinafter a preferred embodiment of the present invention will be described in detail with reference to the accompanying drawings.

Figure 1:
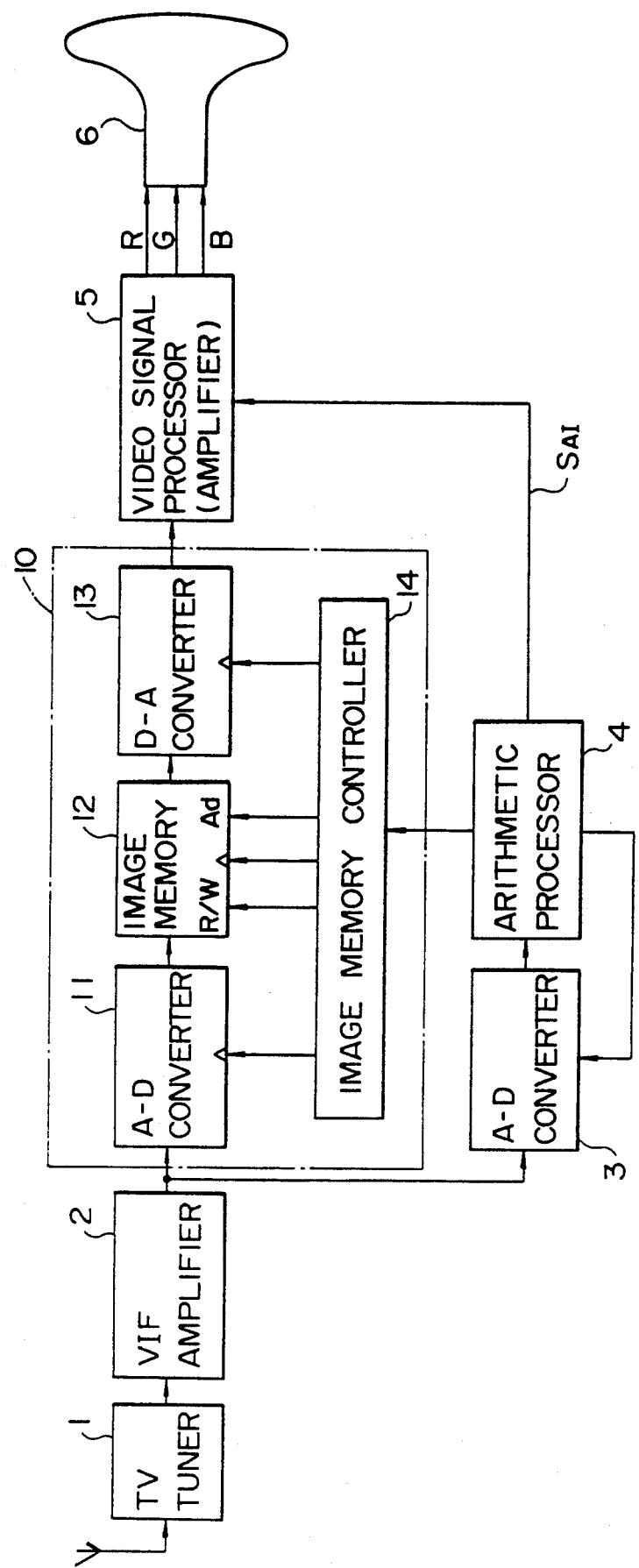
FIG. 1 is a block diagram of an exemplary color television signal display apparatus embodying the present invention.

FIG. 1 is a block diagram of an exemplary color television image display apparatus embodying the present invention where a delay means is composed of an image memory. In this diagram, the same reference numerals and symbols as those used in FIG. 2 denote the same or corresponding components, and both a power supply circuit and an audio circuit are omitted.

A rectangular section 10 enclosed with a one-dot chained line denotes a delay means employed in this embodiment. The delay means 10 comprises an A-D (analog-to-digital) converter 11 for converting the supplied video signal into a digital signal, an image memory 12 where the digital video data is stored and read out at a predetermined time, a D-A (digital-to-analog) converter 13, and an image memory controller 14 for supplying a timing clock signal to both the A-D converter 11 and the D-A converter 13 while supplying a read/write control signal, an operation clock signal and an address data to the image memory 12 so as to control the operation thereof. The storage capacity of the image memory 12 is set in conformity with the time required for the arithmetic processor 4 to generate an image quality control signal $S_{AI}$. For example, when a time of 0.1 second is required for generation of an image quality control signal $S_{AI}$, it is desired that the capacity of the image memory be sufficient to store at least six fields of the image data.

Figure 2:
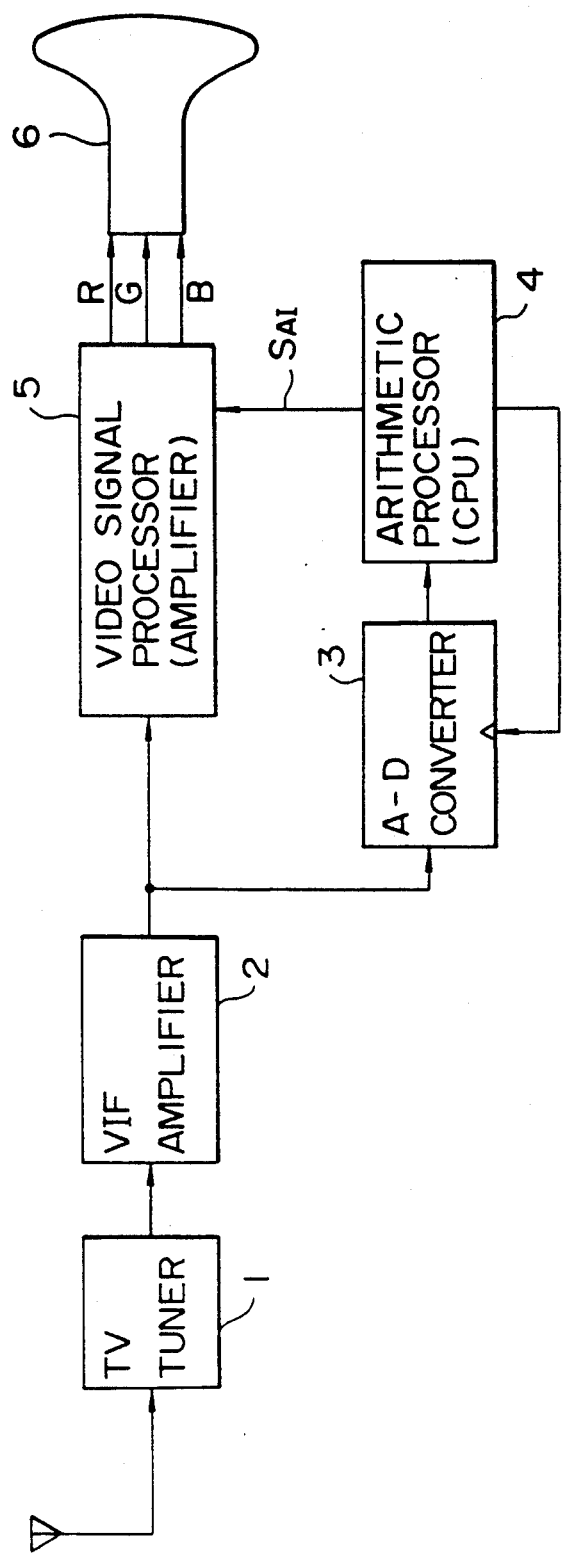
FIG. 2 is a block diagram of a conventional example of a television signal display apparatus.
Figure 3:
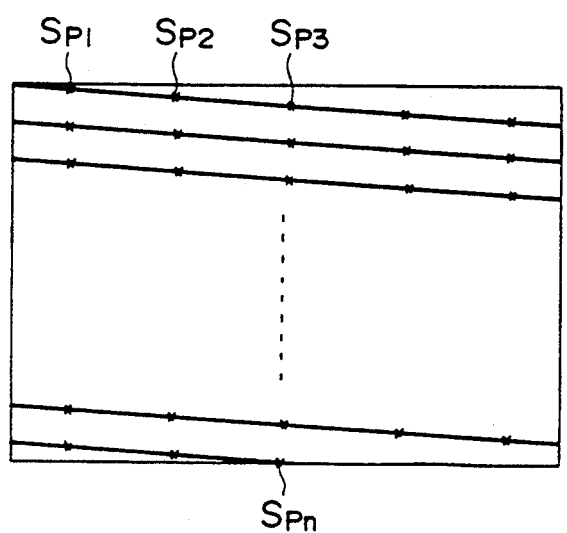
FIG. 3 schematically illustrates a sampling operation for automatic image quality control.

A video signal fed via a TV tuner 1 and an IF (intermediate frequency) amplifier 2 is supplied to an A-D converter 3 and an arithmetic processor 4 similarly to the aforementioned example of FIG. 2, so that a predetermined arithmetic process is executed with regard to every field of the video signal to thereby generate an image quality control signal $S_{AI}$. Meanwhile, the video signal is supplied also to the A-D converter 11 to become digital data, which is then stored in the image memory 12.

The video data stored in the image memory 12 is read out therefrom in synchronism with the output timing of the image quality control signal $S_{AI}$ under control of the image memory controller 14 and is converted into analog video data, which is then inputted to the video signal processor 5. Consequently, where, for example, a time of 0.1 second is required for generation of the image quality control signal $S_{AI}$, input of the video signal is delayed for 0.1 second.

In the video signal processor 5, a predetermined process (such as luminance amplification to a level preset by the image quality control signal $S_{AI}$ for example) is executed for the input video signal in accordance with the image quality control signal $S_{AI}$, and also the R (red), G (green) and B (blue) signals are demodulated. Thereafter, the color signals thus demodulated are outputted to a CRT (cathode-ray tube) display unit 6. The operation mentioned above is performed with regard to every field of the video signal, so that the image having automatically adjusted quality can be displayed on the CRT display unit 6.

In this embodiment, where the video signal is delayed by the delay means 10 for a time required for generation of the image quality control signal $S_{AI}$, the process based practically on the image quality control signal $S_{AI}$ can be executed for the video signal of the field to be controlled by the image quality control signal $S_{AI}$, thereby averting the disadvantage that the image being controlled is rendered noncoincident by the delay derived from generation of the image quality control signal $S_{AI}$.

When a time of 0.1 second is required for generation of an image quality control signal in such automatic image quality control operation performed with regard to every field as in this embodiment, it is necessary for the image memory 12 to have a storage capacity of at least 6 fields of the video signal as mentioned to attain a timing coincidence between the video signal and the image quality control signal $S_{AI}$ inputted to the video signal processor 5. However, the desired effect can be achieved to a certain extent even if a complete input timing coincidence is not exactly attained. For example, when the image memory 12 has a storage capacity of merely 3 fields, there occurs an input timing difference of 0.05 second even by setting a maximum delay value. It follows that an image quality adjustment based on the image quality control signal $S_{AI}$ is executed for the field posterior by three fields to the data-sampled field relative to generation of the image quality control signal $S_{AI}$. However, if the timing difference corresponds merely to three fields or so, any sudden change of the displayed image gives no incongruous visual impression to a television viewer. Therefore it is not necessary for the delay means 10 to have a delay value exactly corresponding to the time required for generation of the image quality control signal $S_{AI}$.

It is a matter of course that the required storage capacity of the image memory 12 can be reduced if the time for generation of the image quality control signal $S_{AI}$ is shortened by the use of a high-speed microcomputer or the like.

Although a description has been given with respect to an exemplary case of executing an automatic image quality adjustment for every field of the video signal, a similar adjustment may be executed for every frame or every several fields. Furthermore, it is not exactly necessary to provide an exclusive delay means as the image memory 12, and in any appliance having an image memory to perform other processes, such image memory may be utilized for the delay mentioned. It is also to be understood that the delay means is not limited to a type utilizing an image memory.

According to the color television image display apparatus of the present invention, as described hereinabove, a video signal is delayed by a delay means in conformity with the time required for generation of an image quality control signal, whereby it is rendered possible to eliminate the known disadvantage that an automatic image quality adjustment is delayed from the video output to be adjusted, thereby averting an incongruous visual impression that may otherwise be given to a television viewer due to some sudden change in the image being displayed.

What is claimed is:

1. A color television image display apparatus comprising:
    a video signal processing circuit for controlling a luminance amplification level of an input video signal fed thereto prior to display;
    means for supplying a video control signal to said video signal processing circuit, including sampling means for dividing every field of the input video signal into n digital data samples, and arithmetic processing means supplied with said n digital data samples from said sampling means for generating therefrom the video control signal fed to said video signal processing circuit for adjusting the luminance amplification level of a displayed video image; and
    signal delay means for time delaying in response to a timing signal from said arithmetic processing means the input video signal fed to said video signal processing circuit for a time substantially equal to a time required by said arithmetic processing means to generate the video control signal fed to said video signal processing circuit, wherein said signal display means includes an analog-to-digital converter receiving an input video signal for display and producing therefrom digital video data, a field memory for storing said digital video data, and a digital-to-analog converter connected in series, and a memory controller connected to receive the timing signal from said arithmetic processing means for controlling said field memory to read out said digital video data with output timing the same as output timing of said video control signal, so that the phase of the video signal is coincident with the phase of said video control signal supplied to said video signal processing circuit.

* * * * *